(12) United States Patent
Thitithamasak

(10) Patent No.: US 10,380,912 B2
(45) Date of Patent: Aug. 13, 2019

(54) LANGUAGE LEARNING SYSTEM WITH AUTOMATED USER CREATED CONTENT TO MIMIC NATIVE LANGUAGE ACQUISITION PROCESSES

(71) Applicant: Mongkol Thitithamasak, Jackson Heights, NY (US)

(72) Inventor: Mongkol Thitithamasak, Jackson Heights, NY (US)

(*) Notice: Subject to any disclaimer, the term of this patent is extended or adjusted under 35 U.S.C. 154(b) by 135 days.

(21) Appl. No.: 15/272,512

(22) Filed: Sep. 22, 2016

(65) Prior Publication Data
US 2017/0084198 A1    Mar. 23, 2017

Related U.S. Application Data

(60) Provisional application No. 62/221,703, filed on Sep. 22, 2015.

(51) Int. Cl.
G09B 19/06 (2006.01)
G09B 5/06 (2006.01)

(52) U.S. Cl.
CPC ............ G09B 19/06 (2013.01); G09B 5/065 (2013.01)

(58) Field of Classification Search
CPC ..................................................... G09B 19/06
USPC ........................................................ 434/157
See application file for complete search history.

*Primary Examiner* — Kesha Frisby
(74) *Attorney, Agent, or Firm* — Dunlap Bennett & Ludwig PLLC; Brendan E. Squire

(57) ABSTRACT

A language learning system with automated user created content to mimic native language acquisition processes. The system replaces less appealing learning content with a student's favorite content to increase motivation to learn and by deemphasizing the goal to understand the content, it allows students to fully use their natural ability to listen and reproduce sounds, which are the most effective process for acquiring listening and speaking skills.

12 Claims, 3 Drawing Sheets

LANGUAGE LEARNING SYSTEM WITH AUTOMATED USER CREATED CONTENT TO MIMIC NATIVE LANGUAGE ACQUISITION PROCESSES

CROSS-REFERENCE TO RELATED APPLICATION

This application claims the benefit of priority of U.S. provisional application No. 62/221,703, filed Sep. 22, 2015, the contents of which are herein incorporated by reference.

BACKGROUND OF THE INVENTION

The present invention relates to language learning systems and methods, and more particularly dynamic creation of language learning content selected by a user learning a non-native language.

As the importance of second language skills increases, more citizens than ever have tried to learn the second language, but many failed because of lacking motivation and a flaw in traditional process of learning. First of all, learning content is often prepared or chosen by the instructors and it is not necessarily entertaining or preferred by the students. In this instance, the content is less appealing to the students. Secondly, preparing and updating the learning content are time-consuming processes. Once the initial preparation is done, the content becomes static and is hardly ever changed over extended periods of time.

Accordingly, the prepared content becomes outdated quickly and becomes less interesting for the students to learn. Furthermore, traditional language learning processes focus on learning vocabularies and grammar, which is not the way we learned our first, or primary language. As such, most students either quit or have taken so many years to learn the language yet they can barely maintain a basic conversation in the studied language. This is because conventional language learning processes do not focus on listening and speaking skills, which are mandatory skills for successful non-native language acquisition.

As can be seen, there is a need for replacing conventional, less appealing learning content with a student's favorite content. This will increase motivation to learn and by not emphasizing the goal to understand the content allows students to fully use their natural ability to listen and reproduce sounds, which are the most effective process for acquiring listening and speaking skills.

SUMMARY OF THE INVENTION

In one aspect of the present invention, a system for language learning with auto created user content, includes: a computer having a user interface; and a program product comprising machine-readable program code for causing, when executed, the computer to perform process steps. An initial step includes receiving a user provided audiovisual content, wherein an audio track of the audiovisual content is in a target learning language. The system will automatically extract a textual representation of a word from the audio track through operation of a voice recognition module. A corresponding image corresponding to the textual representation may be retrieved from one of an image repository, or from the user provided audiovisual content. The textual representation and the image are then automatically stored as an item of instructional content. The textual representation for each word is scored with a difficulty level.

The instructional content is displayed in an instructional session for a specified period of time. In an evaluation session, the textual representation is presented with a plurality of images wherein only one of the plurality of images is the corresponding image. The system is configured to receive a user's selection of one of the plurality of images and determine whether the user's selection is the corresponding image.

In other embodiments of the system, an audio representation of a word may be automatically extracted from the user provided audiovisual content and is stored with the corresponding image as additional instructional content. The audio representation may then be presented with a plurality of images, wherein only one of the plurality of images is the corresponding image. The system receives the user's selection of one of the plurality of images and determines whether the user's selection is the corresponding image.

In other aspects of the invention, the system may present the audio representation of the word, receive the user's vocalization of the word; analyze the user's vocalization with a voice recognition module; and determine whether the user's vocalization of the word is correct.

In yet other aspects, the system may be configured to present a plurality of the textual representations in a sentence. It would then highlight a first read word. Upon receiving the user's vocalization of the first read word, the system analyzes the user's vocalization of the first read word with a voice recognition module, and determines whether the user's vocalization of the first read word is correct. If the user's vocalization is correct, the system presents a subsequent read word from the sentence, receives the user's vocalization of the subsequent read word, analyzes the user's vocalization of the subsequent read word with a voice recognition module; and then determines whether the user's vocalization of the subsequent read word is correct.

These and other features, aspects and advantages of the present invention will become better understood with reference to the following drawings, description and claims.

DETAILED DESCRIPTION OF THE INVENTION

Figure 1:
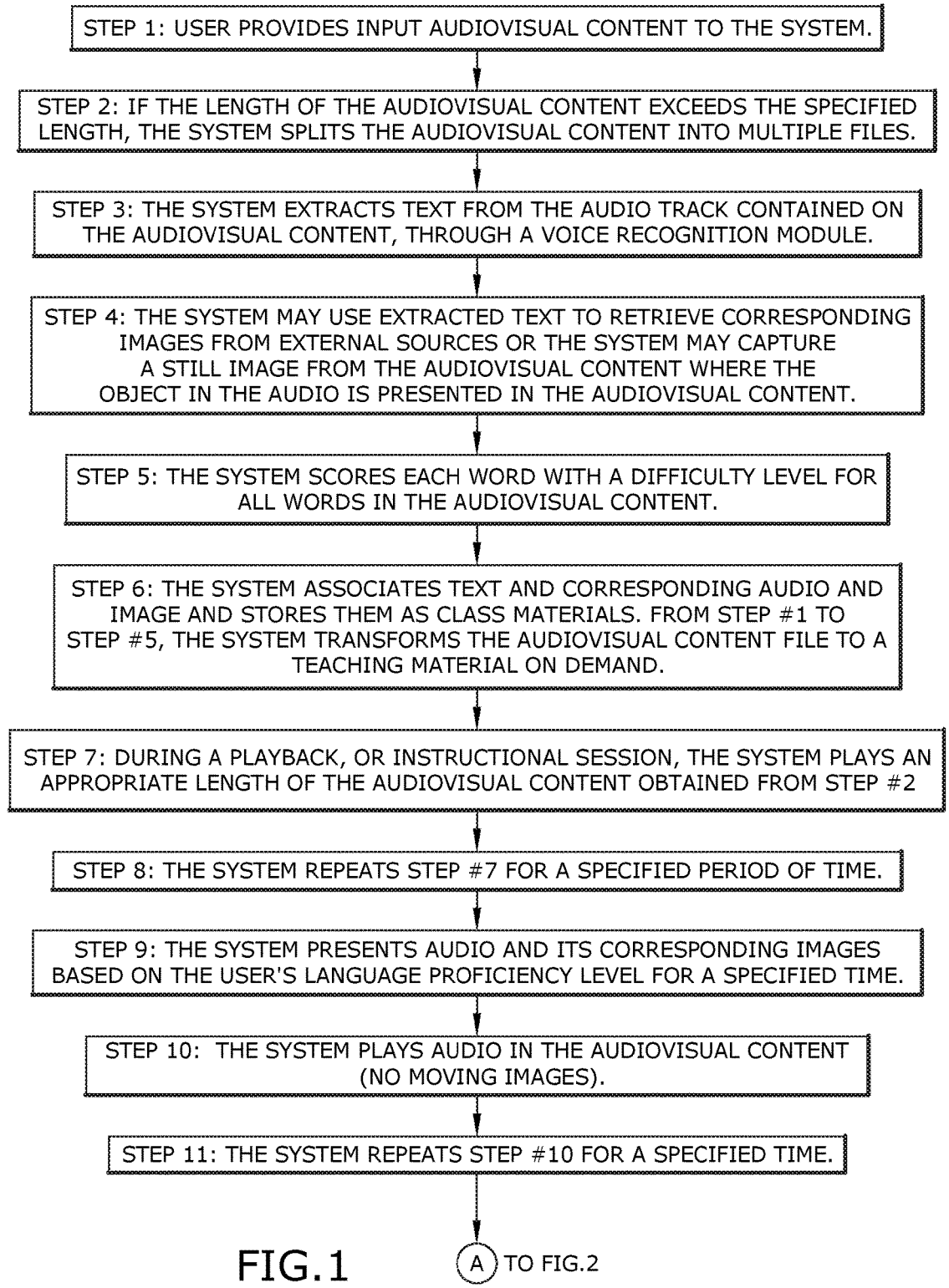
FIG. 1 is a flowchart representing a progression in levels of learning according to aspects of the present invention.
Figure 2:
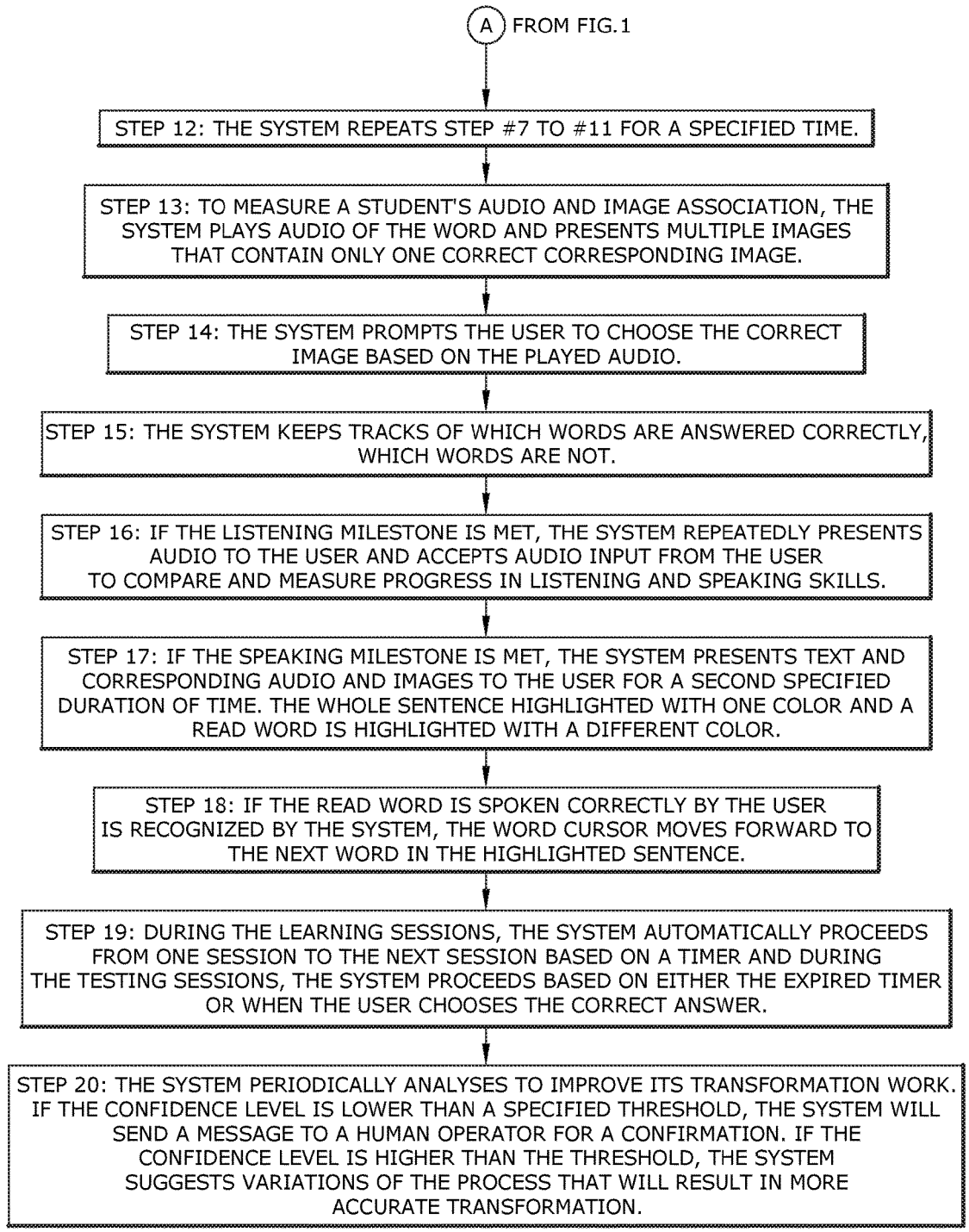
FIG. 2 a continuation of the flowchart of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a system and method for language learning that provides dynamically updated content that interest students and makes the learning process more appealing.

As stated above, as the importance of second language skills increase, more citizens than ever have tried to learn a second language, but many failed because they may lack the necessary motivation and also due to flaws in traditional language learning processes. First of all, learning content is often prepared or chosen by the instructors and it is not necessarily entertaining or preferred by the students. Consequently, the content is less appealing to the students. Secondly, preparing and updating the learning content are each time-consuming processes. Usually, once the preparation is done, the content tends to become static and is hardly changed over a long period of time. So, the prepared content becomes outdated quickly and less interesting for students to learn. Furthermore, traditional processes focus on learning vocabularies and grammar which is not the way we learn our first language. As a result, most students either quit or took so many years to learn the language and barely maintain basic conversation in the studied language.

The system and method of the present invention allows individuals to choose their own content in the target language. This increases their interest in learning. The invention also allows semi-automation or full automation in some cases of instructional content preparation. As a result, the content is always up-to-date and more suited to user's interests. In addition, the system and method of the present invention presents the content in fashion similar to or the same steps we learn our native language, which is the most natural and efficient way to learn a language. Accordingly, the present invention makes learning more fun, with dynamic content in the most effective steps.

The present invention offers innovative process to turn any user audio visual content into language learning content. In addition to freedom to use user's own content, the language learning process enables users to develop strong listening and speaking skills, whereas traditional methods focus on learning vocabularies and grammar.

As explained above, traditional learning content is not created with a students' preferred content. So, students have less motivation to learn and the learning process focuses on vocabularies and grammar that creates a false expectation that understanding the learning content is required. Trying to understand the content while listening interferes the human natural ability to listen and reproduce sounds. Replacing less appealing learning content with student's favorite content increases motive to learn and by not emphasizing the goal to understand the content, allows students to fully use their natural ability to listen and reproduce sounds, which are the most effective process for acquiring listening and speaking skills.

According to aspects of the invention, the system and method can produce language learning system on a mobile device, Language Learning System in a car, Language Learning System in a home, Language Learning System on any internet connected device.

A method of the present invention may include the following steps:

1. User provides input audiovisual content to the system. The audiovisual content will typically, though not necessarily be in the target language.

2. If the length of the audiovisual content exceeds a specified length, the system splits the audiovisual content into multiple files.

3. The system extracts text from the audio track contained on the audiovisual content, through a voice recognition module.

4. The system may then use the extracted text to retrieve corresponding images from an external source or the system may capture a still image from the audiovisual content where the object in the audio is presented in the audiovisual content.

5. The system scores each word with a difficulty level for all words in the audiovisual content.

6. The system associates text and corresponding audio and image and stores them as class materials. From step #1 to step #5, the system transforms the audiovisual content file to a teaching material on demand.

7. During a playback, or instructional session, the system plays an appropriate length of the audiovisual content obtained from step #2 and prepared through its transformation in Step 6.

8. The system repeats step #7 for a specified period of time.

9. The system presents audio and its corresponding images based on the user's language proficiency level for a specified time.

10. The system plays audio in the audiovisual content (no moving images).

11. The system repeats step #10 for a specified time.

12. The system repeats step #7 to #11 for a specified time.

13. To measure a student's audio and image association, the system plays audio of the word and presents multiple images that contain only one correct corresponding image.

14. The system prompts the user to choose the correct image based on the played audio.

15. The system keeps tracks of which words are answered correctly, which words are not.

16. If the listening milestone is met, the system repeatedly presents audio to the user and accepts audio input from the user to compare and measure progress in listening and speaking skills.

17. If the speaking milestone is met, the system presents text and corresponding audio and images to the user for a second specified duration of time. The whole sentence is highlighted with one color and a read word is highlighted with a different color.

18. If the read word is spoken correctly by the user is recognized by the system, the word cursor moves forward to the next word in the highlighted sentence.

19. During the learning sessions, the system automatically proceeds from one session to the next session based on a timer and during the testing sessions, the system proceeds based on either the expired timer or when the user chooses the correct answer.

20. The system periodically analyses to improve its transformation work. If the confidence level is lower than a specified threshold, the system will send a message to a human operator for a confirmation. If the confident level is higher than the threshold, the system suggests variations of the process that will result in more accurate transformation.

The teaching content creation (steps 1-6) may be automated as soon as the user has provided an audiovisual content in a target language. These steps are required for the system before the system can proceed with the simulation of native language acquisition (steps 7-12). In these steps the system simulates visual movement of the world around our toddler users with audiovisual content and simulates parental vocabulary teaching with the association of still images and audio words from the audiovisual content. With enough repetition and reinforcement of related materials, namely, audiovisual content, audio and images.

Toddler users will be able to associate audio with the shown image and they will be able to distinguish the corresponding image to the audio among several images. The evaluation of the student's progress (steps 13-15) is where student responses to the system are captured and analyzed to assess and to show progress report to parents. The promotion of the learning level (steps 16-18) is based on developing the required foundation levels from listening skill to speaking and then reading skill. The step 19 simulates a continuous learning environment.

The step 20 is a quality control step. The system will ask for a confirmation when it is not sure what decision to make and suggest a way to improve based on observation of human operator actions.

By following the above-listed steps, the system transforms an audiovisual content in a target language to teaching materials. It then presents the obtained materials in the most natural way of learning. The user's progress can be captured and reported. The promotion is done seamlessly and the system continues to improve itself to perform a better job next time.

Other teaching methods can be added, such as the use of real human communication in the target language, the use of role-play conversation with a Virtual Reality system can be added to improve the learning experience, but any teaching method that requires human resources and static teaching content reduces the cost-effectiveness and dynamic nature of the invention. The present invention can be extended to work with other computer systems such as Artificial Intelligence system, Home Automation system, cloud system, Virtual Reality system, etc. Also, it can create: Language Learning System on a mobile device, Language Learning System in a car, Language Learning System in a home, Language Learning System on any internet connected device.

Figure 3:
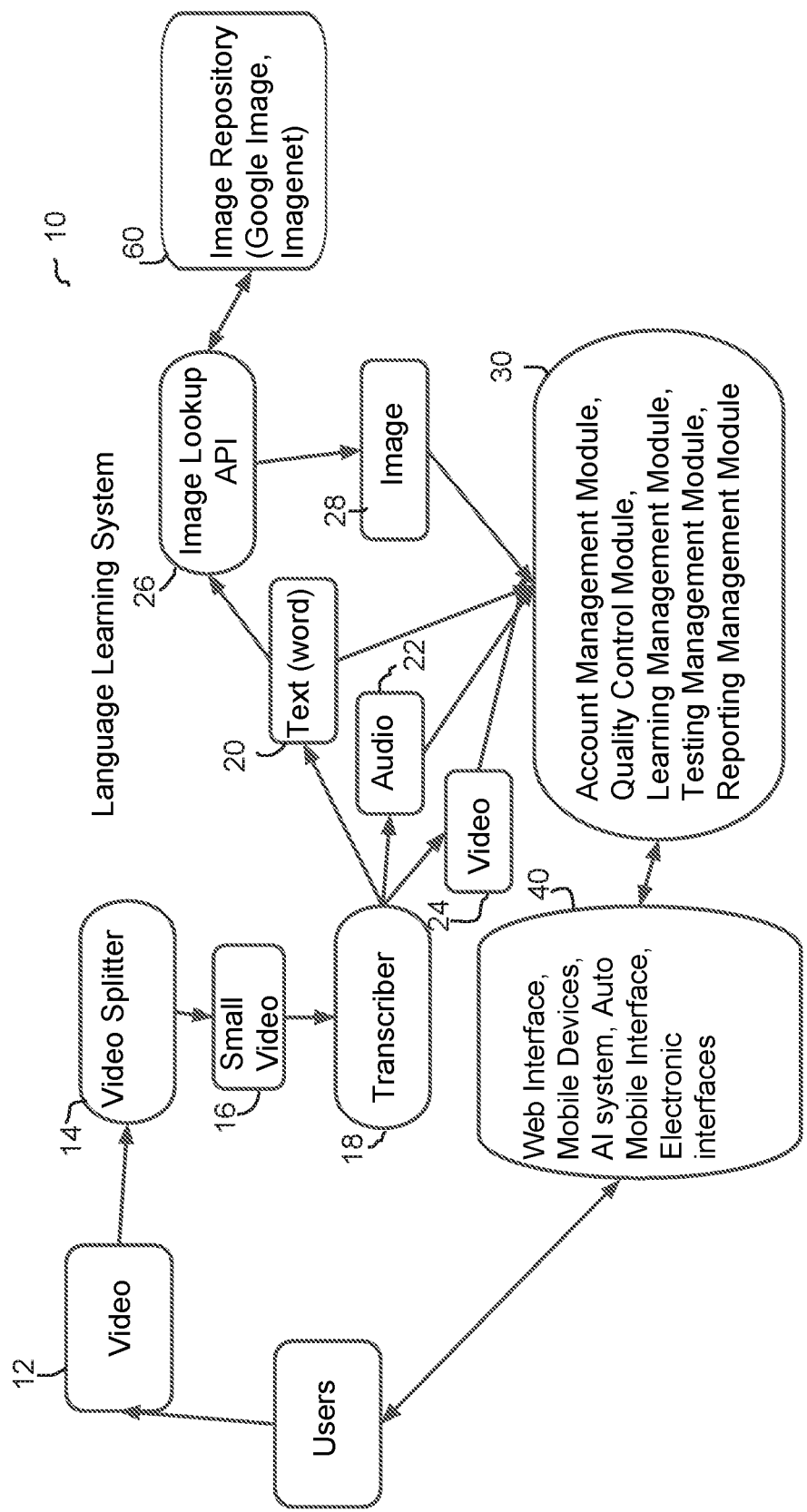
FIG. 3 is a diagram for a system of producing user selected language learning content, and providing that content to the user in a language learning method.

A system according to aspects of the present invention is shown in reference to FIG. 3. The language learning system 10 is configured to receive an audio visual input from one or more users. A video splitter module 14 is configured to analyze a size of the user's audio visual content 12. If the video content 12 is larger than a specified file size, the splitter module 14 will break it into a plurality of smaller audio visual video segments 16. The system 10 will then process each of the small audio video segments 16.

A transcriber module 18 will analyze the small audio video segments 16 and segregate them for further processing according to one of a video component, an audio component, and a textual component. Each component, when present, will be processed by one or more of a textual processing module 20, an audio processing module 22, and a video processing module 24.

The textual processing module 20 is configured to extract words and a text term from the audio track contained on the audio visual content by utilization of a voice recognition module. The system 10 is configured to utilize the extracted text to provide an input for an image lookup application program interface (API) 26, which is configured to search for images from an image repository 60, such as Google images, imagenet, or other source of images corresponding to the text extracted from the audio visual input 12. The system 10 may receive one or more images corresponding to the extracted text term from the image repository 60. In some embodiments, the language learning system 10 is configured to process the visual content portion and perform an image recognition of the user's video content 12 to capture a still image corresponding to the extracted text term. The received images are associated with the text term and are stored in a relational database within the system. The system includes several functioning modules 30 (an account management module, a quality control module, a learning management module, a testing management module, and a reporting management module). The stored content is available as audiovisual content for preparing a customized language instruction program.

The account management module is configured to store parents' and children's information. The quality control module is configured to seek an administrator's confirmation when the automated tasks are performed with low confident levels. The learning management module is configured so to create the on demand teaching material. The learning management module is also configured to present the on-demand teaching material to the user on one or more computing devices, which may include a mobile computing device, via a web interface 40.

In operation, the learning management system is also configured for playback of an instructional session utilizing the user's own created instructional content. In an instructional session, the instructional content is displayed and presented for a specified period of time to give the user an opportunity to learn the instructional materials utilizing their own content. The system presents an audio signal and its corresponding images for a specified period of time, which may be based on the user's language proficiency level. Typically, the development of listening skills is developed with between about 5,000 to 15,000 hours of exposure.

The testing management module is configured to present the content and measure the user's ability and language proficiency. To measure the user's ability to make an association with audio with its corresponding image, the system plays the audio of text term and presents multiple images that contain only one correct corresponding image. The system prompts the user to select an image corresponding to the audio and scores and tracks the user's responses. The results may then be analyzed and reported through the reporting management module.

When the user has achieved his listening milestones, the learning management module is also configured to present materials to develop the user's speaking skills in response to an audio input. As with the audio recognition, the user's verbalization skills are also assessed through the testing module, which is configured with a speech recognition module to interpret and assess the user's verbalization of the text term, with results analyzed and reported through the reporting management module. Speaking skills will typically be developed with between 5,000 hours to 15,000 hours of exposure.

The learning module is also configured to instruct and develop the user's reading comprehension once speaking milestones are achieved. The system is configured to present text and corresponding audio and images to the user for a second specified duration of time. The display presents a highlighted sentence with a first color and a word to be read in a second color highlight. The voice recognition module determines if the user has vocalized the read word correctly, if the user' has vocalized it correctly, the system highlights the vocalized word to the first color and highlights a subsequent read word, the next word in the sentence, in the second color. The system may also be configured to move on to the next read word after the expiry of a specified time duration. Similarly, the system may be configured to move on to a next word upon the expiry of a specified testing duration or may move on after the system has detected a correct verbalization. As with the other testing, the results may be recorded and shown through the reporting management module. The development of reading skills will typically take between 5,000 hours and 50,000 hours of exposure.

The present invention may include at least one computer with a user interface. The computer may include any computer including, but not limited to, a desktop, laptop, and smart device, such as, a tablet and smart phone. The computer includes a program product including a non-transitory machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer.

It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a non-transitory computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A system for language learning with auto created user instructional content, comprising:
 a computer having a user interface; and
 a program product comprising machine-readable program code for causing, when executed, the computer to perform the following process steps:
 receiving a user provided audiovisual content, wherein an audio track of the audiovisual content is in a target learning language;
 automatically, via a transcriber module, extracting the audiovisual content into one or more of a video component, an audio component, and a textual component, wherein a textual processing module extracts a textual representation of a word from the audio component through a voice recognition module;
 automatically retrieving, via an application program interface (API) to an image repository an image corresponding to the textual representation; associating the corresponding image and the textual representation;
 scoring the textual representation of the word with a difficulty level; and
 storing the textual representation, the level of difficulty, and the corresponding image in a relational database.

2. The system of claim 1, further comprising:
 generating the auto created user instructional content based on a user specified language proficiency level and the difficulty level.

3. The system of claim 2, wherein the image is received from an image repository.

4. The system of claim 2, wherein the image is extracted from the user provided audiovisual content.

5. The system of claim 1, further comprising:
 presenting the instructional content in an instructional session for a specified period of time.

6. The system of claim 5, further comprising:
 presenting the textual representation with a plurality of images wherein only one of the plurality of images is the corresponding image;
 receiving a user's selection of one of the plurality of images; and
 determining whether the user's selection is the corresponding image.

7. The system of claim 5, further comprising:
 extracting an audio representation of a word from the user provided audiovisual content; and
 storing the audio representation with the corresponding image.

8. The system of claim 7, further comprising:
 presenting the audio representation with a plurality of images, wherein only one of the plurality of images is the corresponding image;
 receiving a user's selection of one of the plurality of images; and
 determining whether the user's selection is the corresponding image.

9. The system of claim 7, further comprising:
 presenting the audio representation of the word;
 receiving a user's vocalization of the word;
 analyzing the user's vocalization with a voice recognition module; and
 determining whether the user's vocalization of the word is correct.

10. The system of claim 9, further comprising:
 presenting a plurality of the textual representations in a sentence;
 highlighting a first read word;
 receiving the user's vocalization of the first read word;
 analyzing the user's vocalization of the first read word with a voice recognition module; and
 determining whether the user's vocalization of the first read word is correct.

11. The system of claim 10, further comprising:
 presenting a subsequent read word from the sentence;
 receiving the user's vocalization of the subsequent read word;
 analyzing the user's vocalization of the subsequent read word with a voice recognition module; and
 determining whether the user's vocalization of the subsequent read word is correct.

12. The system of claim 1 further comprising:
 an application program interface, configured to search for images corresponding to the textual reference from an image repository.

* * * * *